EXTENDED FREQUENCY RANGE SIGNAL GENERATOR CONTROL MECHANISM

Filed Feb. 7, 1957 6 Sheets-Sheet 1

Fig. II

INVENTOR.
FRANK J. SKWAREK
BY Darby & Darby
ATTORNEYS.

INVENTOR.
FRANK J. SKWAREK
BY Darby & Darby
ATTORNEYS.

Jan. 12, 1960 F. J. SKWAREK 2,921,270

EXTENDED FREQUENCY RANGE SIGNAL GENERATOR CONTROL MECHANISM

Filed Feb. 7, 1957 6 Sheets-Sheet 3

INVENTOR.
FRANK J. SKWAREK
BY Darby & Darby
ATTORNEYS.

Jan. 12, 1960 F. J. SKWAREK 2,921,270

EXTENDED FREQUENCY RANGE SIGNAL GENERATOR CONTROL MECHANISM

Filed Feb. 7, 1957 6 Sheets-Sheet 4

INVENTOR.
FRANK J. SKWAREK
BY Darby & Darby
ATTORNEYS.

INVENTOR.
FRANK J. SKWAREK
BY Darby & Darby
ATTORNEYS.

Jan. 12, 1960 F. J. SKWAREK 2,921,270

EXTENDED FREQUENCY RANGE SIGNAL GENERATOR CONTROL MECHANISM

Filed Feb. 7, 1957 6 Sheets-Sheet 6

INVENTOR.
FRANK J. SKWAREK
BY Darby & Darby
ATTORNEYS.

2,921,270

EXTENDED FREQUENCY RANGE SIGNAL GENERATOR CONTROL MECHANISM

Frank J. Skwarek, Westbury, N.Y., assignor to Polarad Electronics Corporation, Brooklyn, N.Y., a corporation of New York Application February 7, 1957, Serial No. 638,755

10 Claims. (Cl. 331—177)

The present invention relates to a control mechanism for a signal generator which provides an accurate means of controlling the power output of the signal generator and more particularly to such a mechanism which is arranged to automatically compensate for changes in attenuator characteristics with frequency over a wide frequency range.

It is generally desired that a signal generator provide an output signal which is controllable both in frequency and in power, and furthermore, that the frequency and power may be set to respective desired values with a minimum of difficulty. In the utilization of such a signal generator it is often desired to make observation for a series of different values of frequency or power or both. In the course of such observation, it is important to maintain the frequency and power outputs at the desired levels. For example, if it is desired to make a series of observations for different frequency outputs at a constant power level, it is important that the power level be maintained constant and that a continuous indication be provided so that a continuous check may be maintained on the power level.

The present invention provides a device having this constant indication feature, and furthermore, having an attenuator for controlling the power output which is direct reading in decibels throughout the frequency range of the instrument.

It is accordingly an object of the present invention to provide a signal generator having means for continuously checking the power setting of the signal generator.

It is another object of the present invention to provide a signal generator wherein the power output may be attenuated by adjusting a direct-reading attenuator dial which is accurate throughout the frequency range of the signal generator.

It is another object of the present invention to provide a signal generator having an output attenuator which is coupled to be adjusted in conjunction with a power setting indicator to provide a single dial calibration control having a continuous indication for maintaining a check on the instrument calibration.

It is a further object of the present invention to provide a direct reading attenuator for a signal generator by coupling between its tuning and attenuating mechanisms.

Other objects and advantages will be apparent from a consideration of the following description in conjunction with the appended drawings, in which—

Figure 1:
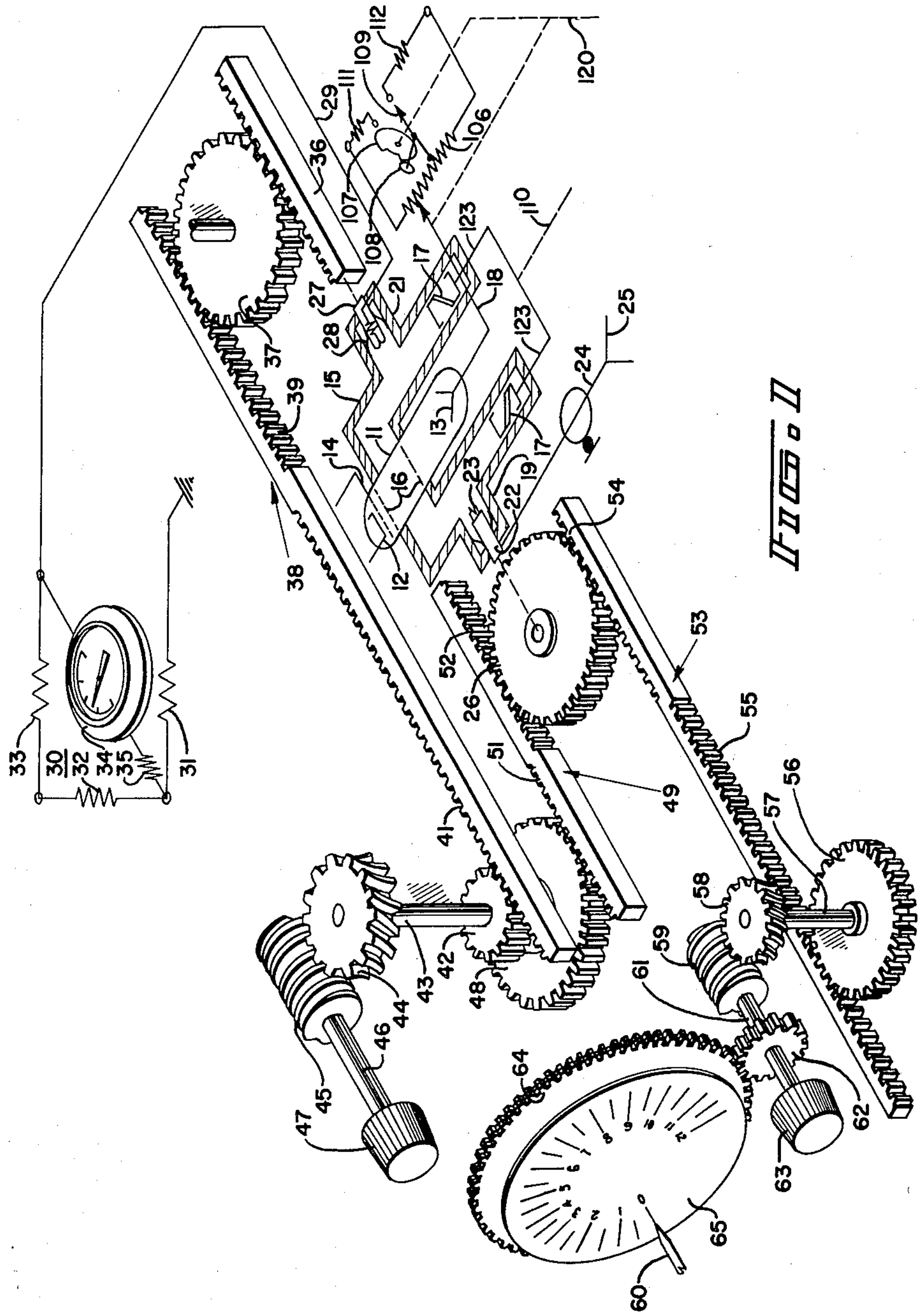
Fig. 1 is a schematic diagram of a power output control mechanism for a signal generator in accordance with the present invention.
Figure 2:
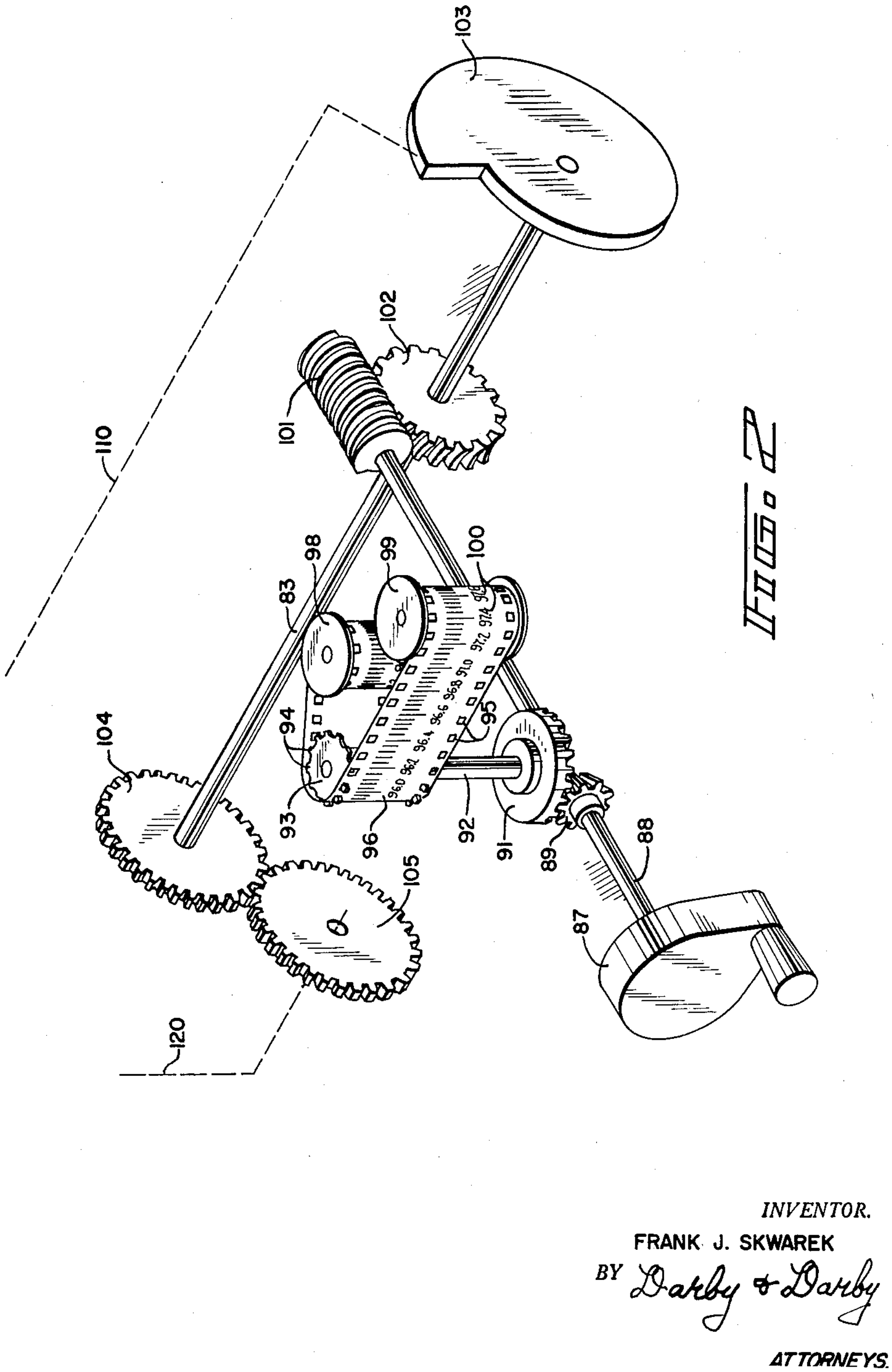
Fig. 2 is a schematic diagram of a tuning control mechanism which operates in conjunction with the frequency characteristic correction mechanism of Fig. 3.
Figure 3:
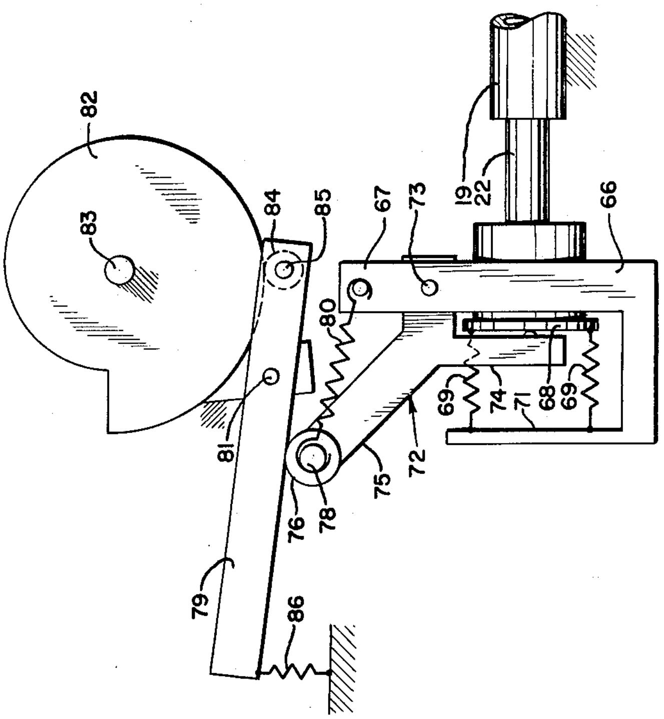
Fig. 3 is a schematic diagram of a frequency characteristic correction mechanism for the output control mechanism of Fig. 1.

The present invention may best be explained by first referring to the schematic diagrams of the mechanisms shown in Figs. 1, 2 and 3. Referring first to Fig. 1, the high frequency oscillator tube for the device is indicated as a klystron shown at 11. It will be understood that the present invention is not concerned with the details of the high frequency electronic circuit and that the present device is not limited to signal generators utilizing klystron oscillators but is in fact generally applicable to high frequency signal generators. The cathode of the klystron 11 is indicated at 12. The klystron 11 may be of the reflex type, having a reflector or repeller electrode indicated at 13. A modulation grid 14 may be provided for imparting a pulse modulation or other type of modulation to the oscillator output.

The klystron tube 11 is located in a coaxial-type cavity resonator 15. The tube 11 thus cooperates with the coaxial cavity resonator 15 by means of interaction grids 16 to generate high frequency oscillations within the cavity. The cavity resonator 15 is tuned by a movable plunger indicated at 17. In addition, the voltage on the repeller electrode 13 applied by means of the electrical lead 18 is controlled to produce the desired frequency output in a manner which will be explained hereinbelow.

Waveguide sections 19 and 21 are connected to receive the R.F. energy from the cavity resonator 15. The waveguide sections 19 and 21 are of small diameter compared to the wavelength of the signal generated by the klystron tube 11. The waveguides 19 and 21 therefore act as attenuators commonly termed "waveguide-below-cut-off attenuators." The signals entering the waveguides 19 and 21 are therefore sharply attenuated along the lengths of the waveguides, and the signal strength at a given point along each of the waveguides 19 and 21 is a logarithmic function of the distance along the waveguide of that point from the entrance point of the waveguide. The waveguides 19 and 21 are symmetrically placed so that the signal strengths at corresponding positions in each of the waveguides is substantially the same.

A probe assembly 22 is slidably mounted coaxially within the waveguide 19. The probe assembly 22 carries a radio frequency pickup element 23 at its outer end. The signal from the pickup element 23 is transmitted by a suitable transmission line 24 to the R.F. output terminal 25. The transmission line 24 may comprise a coaxial cable or waveguide, for example.

In Fig. 1 the attenuator probe assembly 22 is indicated as mechanically coupled to a slidably mounted gear 26 so that translatory movement of the gear 26 to imparted to the attenuator probe assembly 22. This arrangement may be modified to provide a frequency correction for the travel of the attenuator probe assembly 22 in a manner which will be described in the discussion of Fig. 3 below.

A probe assembly 27 carrying a temperature-sensitive resistance element 28 is slidably mounted coaxially with, and extending into, the waveguide section 21. The temperature-sensitive resistance element 28 may, for example, be a thermistor. The radio frequency energy impinging on the end of the thermistor probe 27 will cause an increase in the temperature of the thermistor and thus cause a change in its resistance. The change in the resistance of the thermistor 28 may be measured to obtain an indication of the power output of the klystron tube 11 as measured at the end of the probe assembly 27 in the waveguide section 21.

It will be understood that the particular method of measuring the power at a given point in the waveguide 21 does not constitute a part of the present invention. Any suitable method of measuring the power at a selectable position along the length of the waveguide 21 could be utilized in the present invention. The particular arrangement shown by way of illustration in Fig. 1 includes a lead 29 from the thermistor 28 to a bridge circuit 30. The thermistor 28 therefore constitutes one arm of the resistance bridge 30. The other arms of the bridge are formed by resistors 31, 32 and 33. The balance indicator for the bridge 30 is provided by a meter 34 connected in series with a resistor 35 across a diagonal of the bridge 30.

The above illustrated arrangement is a common device for measuring the radio frequency energy at a given point in a waveguide. In operation the bridge may be balanced with the oscillator 11 inoperative and thereafter the oscillator 11 may be activated. The R.F. energy impinging on the thermistor 28 will cause a heating of the thermistor and an unbalancing of the bridge circuit 30. The reading of the meter 34 might then be read to provide an indication of the power at the pickup end of the probe assembly 27. Alternatively, the resistance of one of the resistors of the bridge might be changed to re-balance the bridge circuit and this change in resistance might be utilized to indicate the power at the end of the thermistor probe assembly 27.

It will be understood that this arrangement is illustrative only and that other power measuring apparatus could equally well be used. In practice it would usually be desired to arrange the power-set meter 34 to provide a predeterminated calibration reading when the power impinging on the thermistor probe assembly 27 is at a desired reference level, such as one milliwatt, for example.

The sliding movement of the thermistor probe assembly 27 is controlled by a rack member 36 connected to the probe assembly 27. The teeth of the rack 36 engage mating teeth of a pinion 37. The pinion 37 is rotatably mounted on the frame of the mechanism. The pinion 37 also engages the teeth of a rack section 39 forming an integral part of a slidably mounted power-set bar 38. It will thus be seen that the sliding movement of the power-set bar 38 will be transmitted through the pinion 37 to cause an equal movement of the rack 36 and thus of the thermistor probe assembly 27. This arrangement simply provides a change of direction for the movement of the respective members and of course, any equivalent mechanical arrangement to accomplish the same result could be utilized.

The power-set control bar 38 is also provided with a second rack section 41. This rack section engages a pinion gear 42 which is rotatably mounted on the control mechanism frame by means of a shaft 43. The shaft 43 is coupled through a worm wheel 44 and a worm 45 mounted on a shaft 46 to a power-set control knob 47, also mounted on shaft 46.

Turning of the power-set control knob 47 thus causes a rotation of the worm 45 thereby rotating the shaft 43 and causing a translatory movement of the power-set control bar 38. This movement is transmitted and changed in direction by the pinion 37 and rack 36 and applied to the thermistor probe assembly 27. Although it is preferred that a worm and gear arrangement such as that shown be used to facilitate the fine adjustment of the thermistor probe position, it is obvious that other mechanical arrangements might also be devised to accomplish this result.

Mounted on the shaft 43 there is a large gear 48. The gear 48 therefore rotates in conjunction with the gear 42. However the gear 48 has a diameter twice that of gear 42. The teeth of the gear 48 engage a toothed section of a first differential rack member 49. The rack member 49 is slidably mounted so that rotation of the gear 48 causes a translatory movement of the rack member 49.

It should be observed at this point that the power-set control bar 38 and the first differential rack member 49 are both moved by a rotation of the power-set control knob 47 but that the movement of the rack member 49 is twice that of the power-set control bar 38 due to the larger diameter of the gear 48 compared with the gear 42.

The first differential rack member 49 has a second set of rack teeth 52 which engage the differential gear member 26. The differential gear 26 is slidably mounted on the frame of the control mechanism by means of a gear carriage which is not shown in Fig. 1. As previously explained, the attenuator probe assembly 22 is mechanically coupled to move with the differential gear 26.

The differential gear 26 has teeth which engage the rack teeth 52 and which also engage a toothed section 54 of a second differential rack member 53. The second differential rack member 53 is also slidably mounted to slide in a direction parallel to the movement of the first differential rack member 49 and the differential gear 26.

The movement of the gear 26 will now be explained, assuming that the second differential rack member 53 is stationary. When the differential rack member 49 is moved to the right by a rotation of the power-set knob 47, the differential gear 26 will be rotated and will be caused to roll along the second differential rack member 53. Since there can be no relative movement between the peripheral teeth of the differential gear 26 and the toothed section 54 of the differential rack member 53, the linear movement of the axis of the gear 26 (which is midway between the point of engagement of the gear teeth at toothed section 54 and toothed section 52), will be one-half of the linear movement of the first differential rack member 49. The linear movement of the differential gear 26 will thus be observed to be one-half of the movement of the first differential rack member 49 if it is assumed that the second differential rack member 53 is stationary.

It has previously been noted that the movement of the power-set control bar 38 and thus of the thermistor probe assembly 27 is also one-half that of the first differential rack member 49. Thus the movement of the differential gear 26 and the resulting movement of attenuator probe assembly 22 for a given movement of the power-set knob 47 will be equal to the movement of the thermistor probe assembly 27.

The differential gear 26 may also be moved as a result of the sliding movement of the second differential rack member 53. This rack member is provided with a second set of rack teeth 55 which engage a gear member 56 rotatably mounted on the control mechanism frame by means of a shaft 57. A worm wheel 58 is also attached to the shaft 57 and engages a worm 59 attached to the attenuator control shaft 61. The attenuator control shaft is rotated by turning an attenuator control knob 63.

A pinion 62 is attached to rotate with the attenuator control shaft 61 and pinion 62 engages the attenuator dial gear 64. A dial 65 is attached for rotation with the dial gear 64 and an indicator 60 is provided adjacent the dial 65 to indicate the attenuation of the reference signal and thus to indicate the output signal level, for example, in decibels below one milliwatt.

As before, the attenuator mechanical linkage described here is obviously not the only mechanical arrangement suitable for this function. Many other mechanical linkages could be devised to accomplish the same result within the scope of the invention. The attenuator control linkage may be adjusted so that when the dial 65 is set at zero, the attenuator probe assembly 22 and the thermistor probe assembly 28 will be in the same relative positions in their respective waveguide sections 19 and 21. The operation of the portion of the output control mechanism thus far described will now be explained.

When the attenuator probe assembly 22 is placed in the same relative position in the waveguide 19 as that of the thermistor probe assembly 28 in the waveguide 21, the power impinging on and picked up by these two elements will be equal. Thus under these conditions the power received by the pickup 23 and transmitted at the R.F. output 25 will be indicated at the power-set meter 34 as the probes 22 and 27 are inserted equal distances into their respective waveguides 19 and 21. In the operation of the signal generator the thermistor probe assembly 27 will be adjusted by means of the power-set knob 47 so that the power-set meter will read at the "calibrate" level and thus a reference power level of one milliwatt, for example, will be present at the end of the thermistor probe assembly 27.

Since the reference power level is always present at the end of he thermistor probe assembly 27 it follows that the same reference power would be present at the R.F. output 25 if the attenuator probe assembly 22 is placed in a position corresponding to that of the thermistor probe assembly 27. As previously explained, the mechanical linkage is arranged so that when these two probe assemblies are in the same relative positions, the attenuator dial 65 reads zero decibels below one milliwatt thus indicating the power at the R.F. output 25.

The attenuation produced by the waveguides 19 and 21 varies as a logarithmic function of a distance along the waveguide. Thus a unit displacement of the attenuator probe will cause a fixed proportionate attenuation of the signal, or in other words, an attenuation of a fixed number of decibels. The distance by which the position of the attenuator probe assembly 22 varies from that corresponding to the pre-set position of the thermistor probe assembly 27 is therefore directly proportional to the number of decibels by which the power output at the output terminal 25 varies from the reference power level of one milliwatt. This difference between the positions of the attenuator and thermistor probe assemblies is indicated on the attenuator dial 65. The attenuator dial therefore may be calibrated directly and substantially linearly in decibels. With the attenuator dial calibrated directly in decibels, the output from the R.F. output 25 may be read directly from the attenuator dial 65 as long as the power-set meter 34 is maintained at its same calibration reading by adjustment of the power-set knob 47.

The arrangement of Fig. 1 provides a very practical signal generator control mechanism for a single frequency or for a limited range of frequencies. For any other frequency of operation, with a zero dial reading, the power-set knob is adjusted to reset the meter 34 at its same calibration positions. This simultaneously adjusts the output powers at terminal 25 to the reference level without affecting the dial reading. However, for waveguides 19 and 21 of practical size, the attenuation per unit length of the waveguide is also a function of frequency or wavelength. It will therefore be obvious that the attenuation (in decibels) at the R.F. output 25 is thus not solely a linear function of the difference between the positions of the thermistor probe assembly 27 and the attenuator probe assembly 22, but also is a function of the frequency. Fig. 3 shows a frequency-correction mechanism which may be inserted in the device of Fig. 1 so that the signal generator may be varied over a wide frequency range without introducing substantial error in the calibration of the attenuator dial 65. In Fig. 3 the attenuator probe assembly 22 is not directly coupled to the slidable carriage 66 upon which the differential gear 26 is rotatably mounted. Rather, the attenuator probe assembly 22 is slidably mounted on carriage 66 by means of a collar 68 secured to assembly 22 and slidably mounted in upward extension 67 of the differential gear carriage 66. The collar 68 is urged away from the waveguide 19 by springs 69 connected to an upright bracket 71 on the differential gear carriage 66.

The sliding movement of the attenuator probe assembly 22 with respect to the differential gear carriage 66 is controlled by a cam follower 72 pivotally connected to the differential gear carriage by a pivot pin 73. The follower 72 has a downward extension or arm 74 which bears against the collar 68 and thus urges the collar 68 together with the attenuator probe assembly 22 toward the waveguide 19 against the force of the springs 69. The upper arm 75 of the follower 72 is provided with a roller 76 rotatably mounted on the arm 75 by means of a pin 78.

The roller 76 is constrained by a spring 80 to roll along a lever arm 79 which is pivotally connected to the control mechanism frame, as by means of a pin 81. The slope of the lever arm 79 is controlled by the cam 82 which is mounted for rotation with a shaft 83. The shaft 83 is a part of the tuning mechanism of the signal generator which will later be described. The angular position of the shaft 83 is directly proportional to the frequency setting of the signal generator. A roller 84 may be pivotally mounted by means of a pin 85 on the lever arm 79 to provide a follower bearing of the surface of cam 82. The roller 84 is urged against the surface of the cam 82 by a spring 86 or other resilient member attached to the lever arm 79.

If the outline of cam 82 is of such a shape to provide a linear relationship between the movement of the roller 84 and the rotation of the shaft 83, it will be observed that the angle O which the lever arm makes with the horizontal will be approximately a linear function of frequency setting of the signal generator. The cam 82 may, if desired, be formed to provide exactly such a linear relationship.

Let it be assumed now that the differential gear carriage 66 is moved to withdraw the attenuator probe assembly 22 from the waveguide 19 and assume that the frequency setting of the signal generator is such that a slope is imparted to the lever arm 79 as indicated in Fig. 3. Then as the carriage 66 moves horizontally to the left in Fig. 3, the roller 76 will roll along the lever arm 79 and will move upward due to the slope of the lever arm 79 and the force of spring 80. The upward movement of the roller 76 will allow a clockwise rotation of the follower arm 72 under the urging of the spring 80. As the downwardly extending portion 74 of the follower arm rotates clockwise, the attenuator probe assembly 22 will be caused by springs 69 to move to the left with respect to the differential gear carriage 66. Thus to the ordinary movement of the attenuator probe assembly 22 with respect to the waveguide 19, caused by the gear 26 and carriage 66, there will be added a further movement due to the relative movement of the attenuator probe with respect to the differential gear carriage 66. The total movement of the attenuator probe will therefore be:

$$m=s+\Delta S \quad (1)$$

where $m$ is the total probe movement in the waveguide, $s$ is the movement of the differential gear carriage set in by adjusting the control knobs, and $\Delta S$ is the frequency correction movement of the probe with respect to the carriage.

It will be observed however that the magnitude and direction of the additional movement $\Delta S$ depends upon the slope of the lever arm 79. Obviously if the lever arm 79 is level no additional movement $\Delta S$ will be imparted at all. Although the additional movement $\Delta S$ could be made a non-linear function of the frequency, it will normally be desired to make the additional movement $\Delta S$ approximately a linear function of the frequency. In this case:

$$\Delta S=k.f.s. \quad (2)$$

Therefore:

$$m=s+k.f.s. \quad (3)$$

or $$m = s(1+kf) \quad (4)$$

where $k$ is a constant of proportionality and $f$ is frequency. From Equation 4 above it may be observed that the total movement $m$ of the attenuator probe assembly with respect to the waveguide 19 is approximately equal to $s$ (which is directly proportional to the attenuator dial movement) plus a correction factor directly proportional to the frequency setting of the signal generator. Thus by coupling the attenuator probe assembly 22 of Fig. 1 to the differential gear 26 by means of the frequency correction device of Fig. 3 it is possible to automatically correct for the effect of change in the waveguide attenuation with frequency upon the dial calibration, thus providing a control mechanism which is accurate over a wide range of frequencies.

It will be observed that the incorporation of the frequency correction device of Fig. 3 as a linkage between the differential gear 26 the attenuator probe assembly 22 will result in the application of a frequency correction to the movement of the attenuator probe assembly 22 regardless of whether it is brought about by the movement of the attenuator knob 63 or brought about by the movement of the power-set knob 47. This arrangement has been discovered to be a preferable, practical arrangement from the standpoint of both mechanical and electrical considerations.

It should be noted, however, that the frequency correction for the present device could be applied in the attenuator linkage alone, for example, between the rack section 55 and rack section 54 of the differential rack member 53. The rack member 53 would then be divided into two parts slidably movable relative to one another, and the frame member 66 of the frequency-correction device of Fig. 2 would be secured to one such part of the differential rack member 53 while the slidable collar member 68 would be secured to the other part of the differential rack member 53.

If the signal generator were constructed in this manner the frequency correction would be applied in the attenuator control linkage only. Since the amount of movement of the attenuator probe assembly which is contributed by the power-set control bar 38 is small compared to the amount of attenuator probe movement contributed by the second differential rack member 53, it is relatively unimportant whether the frequency correction be applied to the sum of these two movements, represented by the movement of the differential gear 26, or whether the correction is applied to the movement of the second differential rack member 53 alone.

Therefore while the arrangement shown providing a frequency correction device between the differential gear member 26 and the attenuator probe assembly 22 is thought to be preferable to achieve mechanical simplicity and for other reasons, the basic advantages of the present invention could also be achieved by placing the frequency correction mechanism in the attenuator control linkage alone, either in the differential rack member 53 or elsewhere.

The tuning and frequency-indicating mechanism of the signal generator is shown schematically in Fig. 2. A tuning knob 87 is mounted on a shaft 88 which is rotatably mounted on the signal generator frame. A bevel gear 89 is mounted to turn with the shaft 88. The bevel gear 89 engages a second bevel gear 91 which is rotatably mounted with respect to the signal generator frame by means of a shaft 92.

Also mounted on the shaft 92 is a sprocket 93 having a number of teeth 94. The teeth 94 engage sprocket holes 95 in a metal tape 96. The metal tape indicator dial is preferably formed of a resilient metal such as spring steel having a permanent set tending to cause the tape 96 to coil about itself to form a roll.

A section of the tape 96 is held rigidly in place by a guide 97 (shown in Figs. 4 and 5) to form a frequency dial for the signal generator. The tape is provided with suitable indicia such as the numbered 100 marks which may be stamped, etched, cut, imprinted or otherwise placed on the tape. A pointer 90 (also shown in Fig. 4) may be provided to cooperate with the indicia 100 to indicate the frequency setting of the signal generator. Freely rotatable reels 98 and 99 may be provided to retain the loose ends of the spring metal tape in position to avoid interference with other parts of the mechanism.

It will be noted that no take-up device is required on either the reel 98 or the reel 99, and in fact, the tape 96 need not be fastened to the reels 98 and 99, as it will be retained on the reels by reason of its own tendency to coil upon itself to form a roll about the reels 98 and 99. Although metal appears to be the most suitable material for the tape 96, it might alternatively be formed of plastic or other material of a resilient nature.

The novel tuning dial incorporating the resilient tape 96 is an important feature of the present device. The present invention incorporates the necessary improvements in a signal generator tuning and output control mechanism to enable the signal generator to cover an exceptionally wide range of frequencies in a particularly efficient manner. As a result, the ordinary circular dials used heretofore for frequency indication would not be suitable for the present invention. In order to provide dial markings spaced sufficiently to enable them to be accurately read, a circular dial for the present signal generator, which may have a frequency range exceeding 6000 megacycles, would have to be over one foot in diameter. Such a dial would obviously be quite cumbersome and add considerable size to the device. The resilient tape dial shown in Fig. 3 on the other hand occupies only one-fifth of the space which would be required for the conventional circular dial.

The tuning shaft 88 also has affixed thereto a worm 101 which engages a worm wheel 102 fastened to a tuner cam shaft 83. A cavity resonator tuning cam 103 is affixed for rotation with the tuner cam shaft 83. The tuning cam 103 has an external outline such that a follower rolling on the outline of the cam 103 will impart a motion to the tuning plunger 17 of the cavity resonator to tune the cavity to the frequency indicated by the pointer 90 on the frequency dial. This coupling is indicated by the dotted line 110 shown in Figs. 1 and 2. It is preferred that the cam 103 be adjustable as shown in Fig. 5 so that slight variations in the outline of the cam may be made to compensate for variations in the characteristic of different oscillator tubes.

A potentiometer driving gear 104 is also attached for rotation with the tuner cam shaft 83. The potentiometer drive gear 104 engages a driven gear 105 which is connected to the shaft of a potentiometer 106 as indicated by the dotted line 120 shown in Figs. 1 and 2.

Referring again to Fig. 1, the potentiometer 106 is a tracking potentiometer having a characteristic designed to provide the proper voltage for the reflector or repeller 13 of the klystron 11 for all portions of its tuning range. Mode switching resistors 111 and 112 may also be provided in parallel with portions of the tracking potentiometer 106 so that the repeller voltage of the klystron 11 may be abruptly switched at predetermined points thus allowing the klystron to operate in a different mode to extend the total frequency range of the klystron and thus of the signal generator. Switching at a predetermined point in the frequency range may be accomplished by the micro-switch 109 having a follower 108 running on a mode switching cam 107 coupled to rotate with the driven potentiometer gear 105. The particular cavity tuning and reflector tracking arrangement utilized here does not form an important feature of the invention and it should be understood that other cavity tuning and reflector voltage tracking arrangements could equally well be used.

Figure 4:
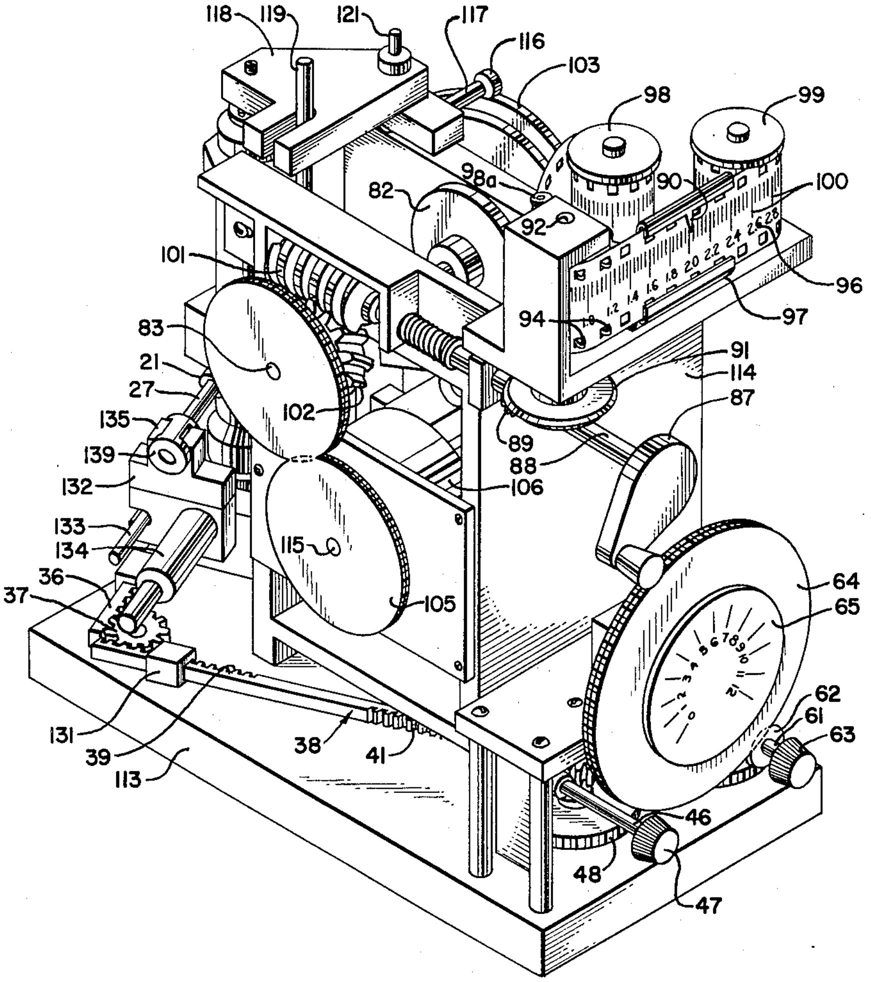
Fig. 4 is an isometric drawing of a signal generator control apparatus according to the present invention taken from the front of the apparatus.
Figure 5:
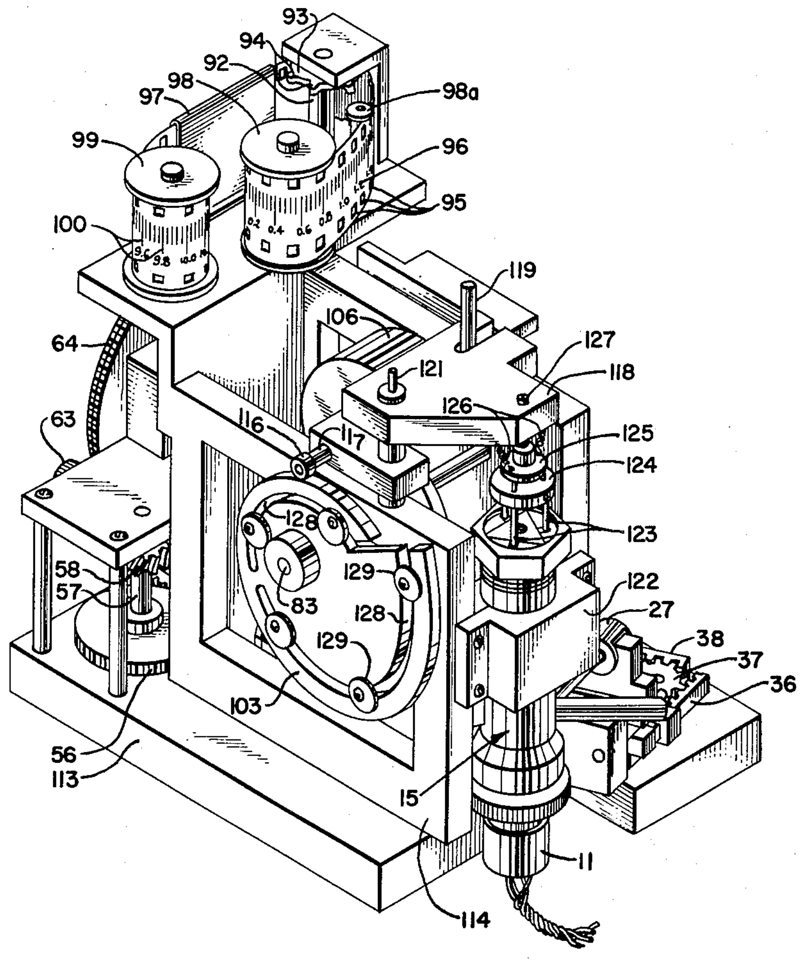
Fig. 5 is an isometric drawing of a signal generator control apparatus according to the present invention taken from the rear of the apparatus.
Figure 6:
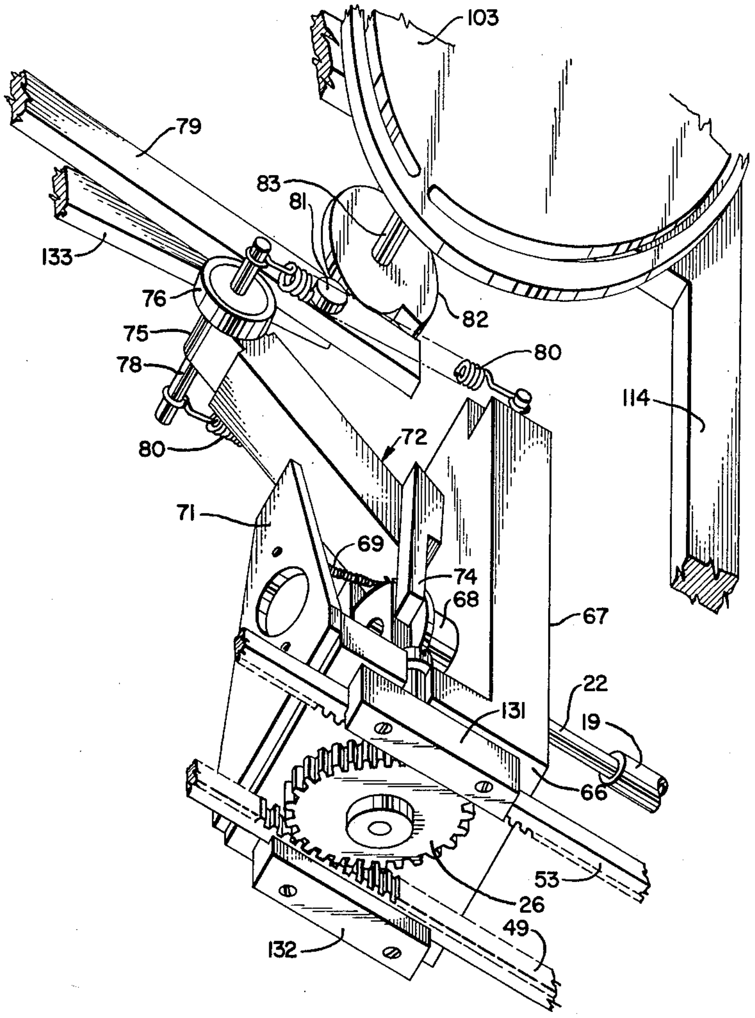
Fig. 6 is an isometric drawing of the frequency characteristic correction mechanism of the control apparatus of Figs. 5 and 6 taken from the front rear righthand side of the apparatus and partially broken away to show the internal portion of the apparatus.

A particular physical embodiment of the mechanism of Figs. 1, 2 and 3 is shown in the isometric drawings, Figs. 4, 5 and 6. The parts in Figs. 4, 5 and 6 are given the same numbers as corresponding parts in the previous figures. Referring first to Fig. 4 a signal generator control mechanism is shown having a base 113 and a boxlike frame 114 supporting the various elements of the mechanism. Extending from the front of the frame 114 is the shaft 88 to which is affixed the tuning knob or handle 87. The tuning knob 87 is connected to drive the metal tape dial 96 of the signal generator through miter gears 89 and 91 in manner previously described with reference to Fig. 2. The shaft 88 extends into the frame 114 where it is connected to the worm gear 101 which drives the worm wheel 102 attached to the shaft 83.

The angular position of the shaft 83 is therefore directly proportional to the frequency setting indicated by the position of the metal tape 96 as indicated by the pointer 90. Attached to the shaft 83 are the potentiometer drive gear 104, the frequency correction cam 82 and the cavity tuning cam 103. The potentiometer gear 105 is connected to the shaft 115 of the potentiometer 106. The potentiometer 106 may therefore be connected to provide a proper repeller electrode voltage for a klystron oscillator, the voltage being automatically varied with changes in frequency setting of the signal generator.

As the frequency setting of the signal generator is varied by rotation of the knob 87, the cam 103 rotates and causes the rise or fall of the roller follower 116. The follower 116 is connected by means of a rod 117 to the cavity tuner block 118. The tuner block 118 is slidably mounted for vertical movement along guide rods 119 and 121.

The cavity resonator tuner mechanism is shown more clearly in Fig. 5. In Fig. 5 it may be noted that the klystron tube 11 is located in a cavity resonator 15 which is retained in fixed position by the resonator bracket 122. The slidable plunger 17 (not shown in Figs. 4 and 5) within the resonator is connected to tuning rods 123. The rods 123 are in turn connected to a disk 124 so that movement of the disk 124 provides a controlled and positive movement of the tuning plunger 17 within the klystron cavity 15. A cap member 125 is attached to the disk 124 by means of a threaded rod so that an adjustable spacing is provided between the cap 125 and the disk 124. The cap 125 is connected to and urged toward the tuner block 118 by spring members 126. The position of the cap 125 relative to the tuner block 118 is adjustable by means of a threaded stop member 127.

From the foregoing description the operation of the cavity resonator tuning mechanism will be obvious. Rotation of the tuning handle 87 causes a rotation of the cam 103 and a resulting vertical movement of the tuner block 118. The block 118 is linked to the tuning plunger within the klystron cavity 15 thus causing the resonant frequency of the cavity to be varied by rotation of the tuning handle 87 extending from the front of the control mechanism frame 114.

The position of the plunger within the resonant cavity may be zeroed or initially adjusted by adjustment of the adjustable stop 127, for example. Preferably the cavity tuning cam 103 is of the adjustable type shown in Fig. 5. The cam 103 in Fig. 5 is provided with slots 128 so that the peripheral surface of the cam may be adjusted to a limited degree. The peripheral surface of the cam 103 may be locked in position by tightening the lock members 129. Where the cavity tuner cam 103 is adjustable as shown in Fig. 5, compensation may be provided for frequency characteristic changes due to replacement of the klystron tube 11 and thus the accuracy of the signal generator output frequency may be improved.

The power-set knob, the operation of which has been previously described in detail, is indicated at 47 in Fig. 4. Rotation of the power set knob 47 rotates the shaft 46 and through a gear train coupling rotates the gear 48. Rotation of the gear 48 causes a movement of the power set bar 38. The power set bar 38 is restrained to linear movement by guide brackets such as indicated at 131. Rack teeth 39 in the power set bar 38 engage the rack gear 37 which also engages teeth on the rack 36.

Linear movement of the rack 38 is thus transmitted to the rack 36 with a change in direction. The rack 36 is affixed to the slidably mounted thermistor probe frame 132. The probe frame 132 is restrained to linear movement by guide bars 133 and 134. The thermistor probe assembly 27 is fastened to the thermistor probe frame 132 by a bracket 135. The probe 27 is provided with a connector 139 for the connection of electrical leads to the temperature sensitive resistance or thermistor 28 carried within the waveguide 21 by the thermistor probe 27.

From the foregoing description it will be obvious that the power-set mechanism shown in Figs. 4 and 5 carries out the operation indicated schematically in Fig. 1.

The attenuator control for the signal generator is also located on the front of the generator frame 114. The attenuator knob is shown at 63 connected to a shaft 61 extending from the front of the frame 114. A gear 62 is affixed to the shaft 61 and meshes with the attenuator dial gear 64. The attenuator dial 65 is coupled to the attenuator dial gear 64 for rotation therewith. The rotation of the attenuator knob 63 causes the translatory movement of the rack member 53 shown in Fig. 6 through a gear train described in the discussion of Fig. 1. In the discussion of Fig. 1, it was also pointed out that the rotation of the power-set knob 47 caused a linear movement of the rack member 49 (shown in Fig. 6).

It will be observed that Fig. 6 shows the interior of the frame 114 as seen from a position below and forward of the tuning cam 103. The tuning cam 103 is therefore indicated in the upper righthand corner of Fig. 6. The frame 114 and other portions of the control mechanism have been broken away in Fig. 6 to show the details of the frequency-correction mechanism indicated schematically in Fig. 3.

The differential gear carriage 66 is slidably mounted on the differential rack members 49 and 53 by means of brackets 131 and 132. The carriage 66 has an upright portion 67 in which is slidably mounted a collar 68 retaining the output probe 22. Thus the position of the output probe assembly 22 within the waveguide 19 depends both upon the position of the carriage 66 and on the position of the collar 68 relative to the upright member 67. The follower arm 72 is pivotally mounted in the upright member 67 and has a downward extending arm 74 which controls the postion of the collar 68. The collar 68 is urged to the left in Fig. 6 by coil springs 69 connecting the collar 68 and a bracket 71 mounted on the rear of the gear carriage 66. The upright arm 75 of the follower arm 72 supports a roller 76 which rolls along the tiltable frequency correction lever 79. The follower arm 72 may be urged upward against the lever 79 by springs 80 connected between the shaft 78 of the roller 76 and the upright section 67 of the gear carriage 66. The lever 79 is rotatably supported within the control mechanism frame 114 by a rigid arm 133. The slope of the lever arm 79 is controlled by the cam 82 affixed to the frequency control shaft 83 in the manner previously explained.

From the foregoing description it will be seen that the displacement of the probe assembly 22 relative to the waveguide 19 will be determined both by the sum of the displacements of the rack members 49 and 53 and by the slope of the lever arm 79. The operation of this particular mechanism is thus seen to correspond to the operation described in connection with the schematic diagrams and in particular Fig. 3.

From the above explanation it may be seen that a particularly practical and efficient signal generator control apparatus has been provided. Particular variations in the construction of the apparatus have been pointed out, however, many other modifications could be made to the particular apparatus disclosed within the scope of the present invention. Therefore, the scope of the present invention is not to be construed to be limited by the particular embodiments shown but rather is to be defined solely by the appended claims.

What is claimed is:

1. In a signal generator including a high frequency oscillator tube and a cavity resonator coupled to said tube to receive the output of said oscillator tube, a control apparatus comprising two below-cut-off waveguides coupled to said cavity to receive power therefrom, a power-sensing device mounted for slidable movement into the first of said waveguides, a power-pickup device mounted for slidable movement into the second of said waveguides, a power-set control, means for simultaneously imparting corresponding movements to both said devices in response to the adjustment of said power-set control, an attenuation control, and means for imparting an independent additional movement to said power-pickup device in response to the adjustment of said attenuator control.

2. A signal generator comprising an oscillator tube, a cavity resonator electrically coupled to said oscillator tube, a first below-cut-off waveguide electrically coupled to said cavity resonator, a second below-cut-off waveguide electrically coupled to said cavity resonator, a power-sensing device slidably mounted in said first waveguide, power-indicating apparatus electrically connected to said power-sensing device, a power-pickup device slidably mounted in said second waveguide, a first slidably mounted rack member linked to said power-sensing device to move therewith, a first gear rotatably mounted in fixed position and engaging said first rack member, a control means for rotating said first gear, a second gear mounted to rotate with said first gear, said second gear having a diameter twice that of said first gear, a second slidably mounted rack member engaging said second gear, a gear carriage slidably mounted to move parallel to the movement of said second rack member, a differential gear rotatably mounted on said carriage and engaging said second rack member, a third rack member slidably mounted to move parallel to the movement of said second rack member and also engaging said differential gear on the side thereof opposite said second rack member, a third gear rotatably mounted in a fixed position and engaging said third rack member, further control means for rotating said third gear, and means for linking said power-pickup device to said gear carriage for movement therewith.

3. A signal generator comprising an oscillator tube, a cavity resonator electrically coupled to said oscillator tube, a first below-cut-off waveguide electrically coupled to said cavity resonator, a second below-cut-off waveguide electrically coupled to said cavity resonator, a power-measurement probe assembly slidably mounted in said first waveguide, a power-sensing device located on the end of said power-measurement probe assembly, power-indicating apparatus electrically connected to said power-sensing device, a power-pickup probe assembly slidably mounted in said second waveguide, an R.F. pickup loop located on the end of said power pickup probe assembly, output terminals for said signal generator, a transmission line connecting said R.F. pickup loop to said output terminals, a first slidably mounted rack member attached to said power-sensing probe, a first gear rotatably mounted in a fixed position and engaging said first rack member, a second slidably mounted rack member engaging said first gear, a second gear rotatably mounted in fixed position and engaging said second rack member, first control means for rotating said second gear, a third gear mounted to rotate with said second gear, said third gear having a diameter twice that of said second gear, a third slidably mounted rack member engaging said third gear, a gear carriage slidably mounted to move parallel to the movement of said third rack member, a differential gear rotatably mounted on said carriage and engaging said third rack member, a fourth rack member slidably mounted to move parallel to the movement of said third rack member and also engaging said differential gear, a fourth gear rotatably mounted in a fixed position and engaging said fourth rack member, second control means for rotating said fourth gear, and means for linking said power-pickup probe to said gear carriage for movement therewith.

4. In a signal generator having a first adjustable output connected to a power-measuring device, a second adjustable output connected to the signal generator output terminals, and a frequency control, control apparatus comprising means for simultaneously adjusting the power at both of said outputs, means for independently imparting an additional adjustment to said second adjustable power output and means for imparting a correction to said second output adjustment in response to changes in the signal generator frequency control setting to compensate for errors in said second output calibration as a result of frequency change.

5. In a signal generator including a high frequency oscillator tube and a cavity resonator coupled to said tube to receive the output of said oscillator tube, a control apparatus comprising two below-cut-off waveguides coupled to receive power from said resonator, a power-sensing device mounted for slidable movement in the first of said waveguides, a power-pickup device mounted for slidable movement in the second of said attenuators, a power set control, means for simultaneously imparting corresponding movements to said probes in response to the adjustment of said power-set control, an attenuation control, means for imparting an independent additional movement to said power-pickup device in response to the adjustment of said attenuator control, a frequency control and means for causing the ratio of movement of said power-pickup device relative to the movement of said attenuator control to be varied in response to changes in the setting of said frequency control.

6. A signal generator comprising an oscillator tube, a cavity resonator electrically coupled to said oscillator tube, a movable tuning element in said resonator for varying the resonant frequency of said cavity, a rotatably mounted tuning cam, a tuning cam follower bearing on said tuning cam and mechanically linked to said movable tuning element, a tuning knob, a gear train connecting said tuning knob to drive said tuning cam, a first below-cut-off waveguide electrically coupled to said resonator, a second below-cut-off waveguide electrically coupled to said resonant cavity, a power-sensing device slidably mounted in said first waveguide, a power indicating apparatus electrically connected to said power sensing device, a power pickup device slidably mounted in said second waveguide, a first slidably mounted rack member linked to move said power sensing device, a first gear rotatably mounted in fixed position and engaging said first rack member, means for rotating said first gear, a second gear mounted to rotate with said first gear, said second gear having a diameter twice that of said first gear, a second slidably mounted rack member engaging said second gear, a gear carriage slidably mounted to move parallel to the movement of said second rack member, a differential gear rotatably mounted on said carriage and engaging said second rack member, a third rack member slidably mounted to move parallel to the movement of said second rack member and also engaging said differential gear, a third gear rotatably mounted in a fixed position and engaging said third rack member, means for rotating said third gear, a frequency-correction cam rotatably mounted for rotation with said tuning cam, a lever arm mounted for pivotal movement in a plane substantially parallel to the movement of said gear carriage, said lever arm having a cam follower bearing against said frequency-correction cam and movable thereby, a follower arm pivotally mounted on said gear carriage and having a follower riding against said lever arm, and means for linking said power-pickup device to said follower arm for movement therewith.

7. A signal generator comprising a klystron oscillator tube having a reflector electrode cavity resonator, electrically coupled to said oscillator tube, a movable plunger in said resonator for varying the resonant frequency of said cavity, a rotatably mounted tuning cam, a tuning cam follower bearing on said tuning cam and mechanically linked to said movable tuning element, a tuning knob, a gear train connecting said tuning knob to drive said tuning cam, a potentiometer having a shaft connected to rotate with said tuning cam, means for supplying an input voltage to said potentiometer, means for connecting the variable output of said potentiometer to said reflector electrode, a first below-cut-off waveguide electrically coupled to said resonant cavity, a second below-cut-off waveguide electrically coupled to said resonant cavity, a power measurement probe assembly slidably mounted in said first waveguide attenuator, a power sensing device located on the end of said power measurement probe assembly, power indicating apparatus electrically connected to said power-sensing device, a power pickup device slidably mounted in said second waveguide, an R.F. pickup loop located on the end of said power pickup device, output terminals for said signal generator, a transmission line connecting said R.F. pickup loop to said output terminals, a first slidably mounted rack member attached to said power measurement probe assembly, a first gear rotatably mounted in a fixed position and engaging said first rack member, a second slidably mounted rack member engaging said first gear, a second gear rotatably mounted in fixed position and engaging said second rack member, means for rotating said second gear, a third gear mounted to rotate with said second gear, said third gear having a diameter twice that of said second gear, a third slidably mounted rack member engaging said third gear, a gear carriage slidably mounted to move parallel to the movement of said third rack member, a differential gear rotatably mounted on said carriage and engaging said third rack member, a fourth rack member slidably mounted to move parallel to the movement of said third rack member and also engaging said differential gear, a fourth gear rotatably mounted in a fixed position and engaging said fourth rack member, means for rotating said fourth gear, a dial coupled to rotate with said fourth gear, a frequency correction cam rotatably mounted for rotation with said tuning cam, a lever arm mounted for pivotal movement in a plane substantially parallel to the movement of said gear carriage, said lever arm having a follower bearing against said frequency correction cam and movable thereby, a follower arm pivotally mounted on said gear carriage and having a follower riding against said lever arm, and means for connecting said power pickup device to said follower arm for movement therewith.

8. In a signal generator having a tunable tube, and output terminals coupled to said tube by a below-cut-off waveguide attenuator having an adjustable element whose attenuation per unit displacement is a function of output frequency, control apparatus comprising a frequency-adjusting control coupled to said tube to vary the output frequency thereof, a power output control coupled to said adjustable element, a power-output indicator coupled to said power-output control to indicate the power output setting thereof, and means responsive to adjustment of said frequency-adjusting control for varying the ratio of displacement of said power-output control to the displacement of said attenuator adjustable element caused thereby.

9. In a signal generator including a tuning mechanism, an attenuator with a movable control element, and a calibrated attenuation-control device, attenuation-correction apparatus comprising a rotatable frequency-correction cam coupled to said tuning mechanism, a lever arm mounted for pivotal movement in a plane substantially parallel to the movement of said movable control element, said lever arm bearing against said frequency-correction cam and being movable thereby, a member mounted for movement parallel to the movement of said control element and mechanically coupled to said calibrated attenuation-control device, a follower arm pivotally mounted coupled to said members and having a follower riding against said lever arm, and means for linking said movable control element to said follower arm for movement therewith.

10. In a signal generator including a tuning mechanism with a tuning control and an attenuator with an attenuation control, control apparatus for correcting calibration of said attenuator for variations in tuning of said generator comprising a pivotally mounted lever arm, means coupling said tuning control to said lever arm to adjust the inclination of said arm in correspondence with adjustment of said tuning control, a translatable member coupled to said attenuation control to be actuated thereby, a pivoted member mounted for conjoint translation with said translatable member and having an arm bearing on said lever, whereby said arm is pivoted in response to translation of said translatable member when said lever is inclined relative to the direction of translation of said last member, and means coupling said attenuator to said pivoted member arm to be actuated thereby, whereby said attenuator is actuated by said attenuation control with such actuation modified in accordance with adjustment of both said attenuation control and said tuning control.

References Cited in the file of this patent

UNITED STATES PATENTS

| | | |
|---|---|---|
| 2,444,194 | Goldstine | June 29, 1948 |
| 2,496,535 | Hoglund et al. | Feb. 7, 1950 |
| 2,508,573 | Hulstede | May 23, 1950 |
| 2,525,554 | Latimer | Oct. 10, 1950 |
| 2,589,248 | Haeff et al. | Mar. 18, 1952 |
| 2,624,780 | Byrne | Jan. 6, 1953 |
| 2,768,356 | Van de Lindt | Oct. 23, 1956 |